US008644886B1

(12) United States Patent  
Delaney et al.

(10) Patent No.: US 8,644,886 B1  
(45) Date of Patent: Feb. 4, 2014

(54) RING-TONE MESSAGING SERVICE

(75) Inventors: Timothy C. Delaney, Normanhurst (AU); Andrew W. Lang, Sydney (AU); Assaph Mehr, St. Leonards (AU); Muneyb Minhazuddin, Quakers Hill (AU)

(73) Assignee: Avaya Inc., Basking Ridge, NJ (US)

( * ) Notice: Subject to any disclaimer, the term of this patent is extended or adjusted under 35 U.S.C. 154(b) by 2332 days.

(21) Appl. No.: 10/801,960

(22) Filed: Mar. 15, 2004

(51) Int. Cl.
*H04M 1/00* (2006.01)
*H04M 3/42* (2006.01)

(52) U.S. Cl.
USPC .......................................... 455/567; 455/415

(58) Field of Classification Search
USPC ........... 455/414.2, 466, 401, 404.2, 415, 567; 379/69, 72, 88.04, 93.17–93.25
See application file for complete search history.

(56) References Cited

U.S. PATENT DOCUMENTS

| | | | |
|---|---|---|---|
| 4,166,929 A | 9/1979 | Sheinbein | |
| 4,277,649 A | 7/1981 | Sheinbein | |
| 5,426,594 A * | 6/1995 | Wright et al. | 709/206 |
| 5,594,784 A * | 1/1997 | Velius | 379/88.02 |
| 5,734,699 A * | 3/1998 | Lu et al. | 455/422.1 |
| 6,041,117 A | 3/2000 | Androski et al. | |
| 6,185,288 B1 * | 2/2001 | Wong | 379/219 |
| 6,199,076 B1 | 3/2001 | Logan et al. | |
| 6,219,413 B1 | 4/2001 | Burg | |
| 6,373,925 B1 | 4/2002 | Guercio et al. | |
| 6,490,346 B2 | 12/2002 | Lee et al. | |
| 6,574,335 B1 | 6/2003 | Kalmanek, Jr. et al. | |
| 6,603,844 B1 | 8/2003 | Chavez, Jr. et al. | |
| 6,631,271 B1 | 10/2003 | Logan | |
| 6,690,770 B2 | 2/2004 | Brandt | |
| 6,741,678 B2 | 5/2004 | Cannell et al. | |
| 6,788,766 B2 | 9/2004 | Logan | |
| 6,816,577 B2 | 11/2004 | Logan | |

(Continued)

FOREIGN PATENT DOCUMENTS

| | | |
|---|---|---|
| GB | 2343084 | 4/2000 |
| WO | WO 99/29091 | 6/1999 |

*Primary Examiner* — Temica M Beamer
*Assistant Examiner* — Joel Ajayi
(74) *Attorney, Agent, or Firm* — Sheridan Ross P.C.

(57) ABSTRACT

An improved system and method to provide important information either, as voice, text, picture, holographic image or video from the calling party to a called party before the called party answers a telephone. The information may be a live or recorded voice, text, image or video message. The calling party may send a voice message, for example, and send it along with a call set-up message. The voice message may be recorded beforehand, recorded as part of the dialing process, or sent live before the call is answered. Instead of the called party's telephone ringing, the recorded voice message is played or the real-time data/bearer stream is heard. The called party hears the voice message instead of the ring tone normally heard when there is an incoming telephone call. If the telephone is not answered, the calling party is sent to voicemail or mms-storage system, where the calling party is given the option to record a voice message which may or may not include the original recorded or live voice message sent along with the call set-up message. Alternatively if the called party has a follow me service, the other contact numbers are attempted as directed in the user preferences before sending the calling party to voicemail. If the calling and called party have telephones, such as mobile phones, IP phones, IP softphones, PDA with telephony capabilities, etc., which allow for multimedia messages such as text, images and video messages, the calling party's recorded voice message may include text, images or video.

53 Claims, 8 Drawing Sheets

(56) References Cited

U.S. PATENT DOCUMENTS

| | | | |
|---|---|---|---|
| 6,941,131 B2 | 9/2005 | Roderique | |
| 6,944,277 B1 | 9/2005 | Viikki | |
| 6,954,455 B1 | 10/2005 | Al Hakim et al. | |
| 6,975,709 B2 | 12/2005 | Wullert, II | |
| 6,983,145 B1 | 1/2006 | Uskela | |
| 6,996,402 B2 | 2/2006 | Logan et al. | |
| 6,999,575 B1 | 2/2006 | Sheinbein | |
| 7,123,903 B2 | 10/2006 | Seki | |
| 7,330,542 B2 | 2/2008 | Kauhanen et al. | |
| 2004/0109409 A1* | 6/2004 | Simpson et al. | 370/229 |
| 2004/0203794 A1 | 10/2004 | Brown et al. | |
| 2004/0213401 A1* | 10/2004 | Aupperle et al. | 379/372 |
| 2004/0223605 A1* | 11/2004 | Donnelly | 379/373.01 |
| 2005/0143103 A1* | 6/2005 | Bjorgan et al. | 455/466 |
| 2005/0147227 A1 | 7/2005 | Chervirala et al. | |
| 2007/0026852 A1* | 2/2007 | Logan et al. | 455/422.1 |

\* cited by examiner

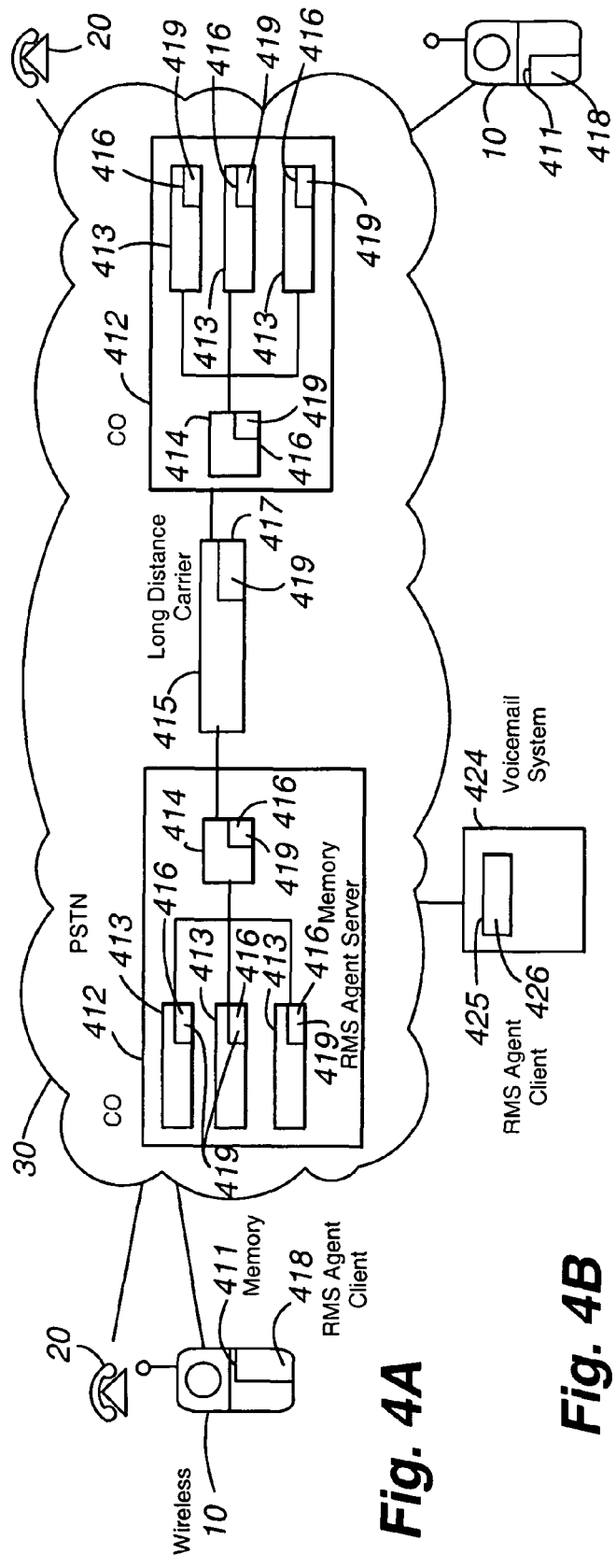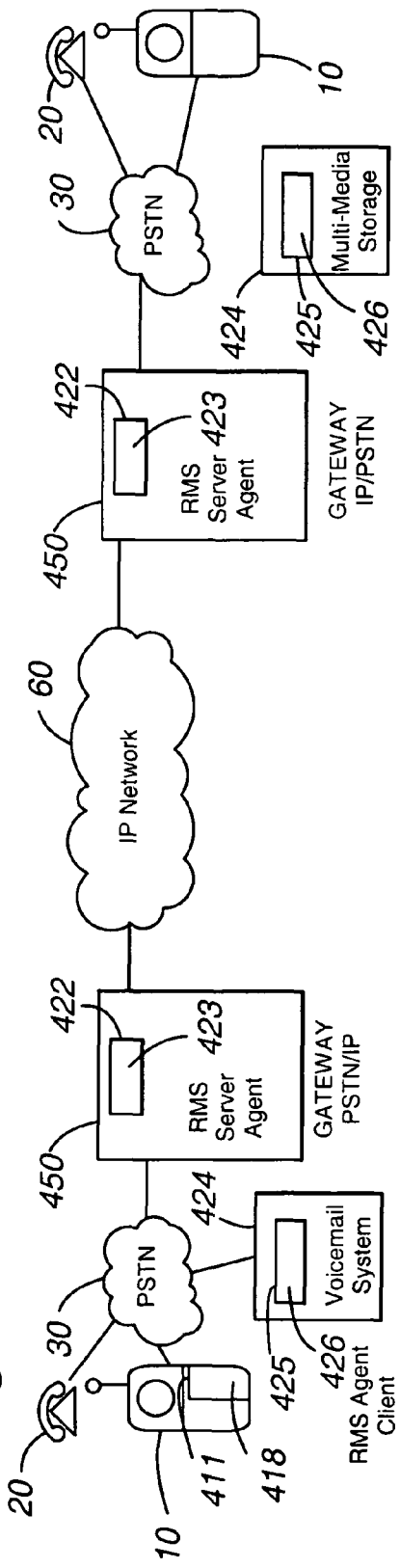
Fig. 4A
Fig. 4B and wireline telephone systems or even paging services currently allow the calling party

RING-TONE MESSAGING SERVICE

FIELD OF THE INVENTION

The present invention is directed generally to telephony services and specifically to providing a message to a called party before the called party answers a call, where the message is used to initiate the call to the called party.

BACKGROUND OF THE INVENTION

FIG. 1A, 1B, 1C shows three example network communication configurations. In FIG. 1A, the calling party initiates a call over the public switch telephone network (PSTN) 30 using either a wireline telephone 20 or wireless telephone 10 (e.g., mobile telephone). The call is routed through a gateway 50 to the Internet 60 to save on long distance toll costs. At the remote end, the call is routed to the gateway 50 and PSTN 30 nearest to the called party who may be using either a wireline 20 or wireless phone 10. If the called party does not answer the call, the call is diverted to voice mail 40. Voice mail 40 answers your call, records a message, and notifies you when you have new messages. Note, a wireless telephone call 10 is set-up, managed and routed to the PSTN 30 by the mobile switch center (not shown).

In FIG. 1B, the calling party initiates a call over the PSTN 30 using either a wireline telephone 20 or wireless telephone 10. In this example, the call is routed solely through the PSTN 30 to the remote end where the called party may be using either a wireline 20 or wireless telephone 10. If the called party does not answer the call but pays for voice mail 40 service as part of their communications bill, the call is diverted to voice mail 40.

In FIG. 1C, the calling party may initiate a call over the PSTN 30 using either a wireline telephone 20 or wireless telephone 10. Similarly, the calling party may initiate a call over the Internet 60 using a H.323 terminal or the session initiation protocol (SIP) telephone 70. H.323/SIP terminals include IP telephones 70 or IP softphones 80. An IP telephone provides communications capability as analog or digital telephones provide except that communications are routed via the Internet or data network rather than via PSTN. An IP softphone 80 is a client-based telephony application for the desktop PC 80 or laptop 80 that has similar functionality as a desktop IP telephone 70.

At the remote end, the private branch exchange (PBX) 36 is a telephone system that supports enterprise users (college, government office, business, etc.) by answering and transferring inbound and outbound telephone calls to and from the PSTN 30 or Internet 60. All enterprise users share external telephone lines, i.e., trunk lines 35, which saves the cost of requiring a line for each user to the telephone company's central office (CO) (not shown but part of the PSTN 30). PBXs 36 have evolved from being proprietary hardware/software systems completely separate from the packet switched network or LAN 39 to systems running on off-the-shelf servers, interoperable with other servers through open standards and communicating via the LAN 39. Furthermore, the PBX 36 has evolved from strictly routing local and long distance telephone calls over the PSTN 30 to additionally providing the capability to route local and long distance telephone calls over the Internet 60 or over the LAN 39. The PBX 36 operating on packet switched networks allow the enterprise to reduce costs by maintaining one network instead of two (the data and telephone) and reducing charges from toll calls by routing some calls over the packet switched network 39 or Internet 60.

As shown generally in FIGS. 1A, 1B, 1C and 2 when a call is initiated using a wireless telephone 10 or a wireline telephone 20, 41, 42 from outside or within an enterprise and sent via the PSTN 30, the calling party 250 dials the telephone number which is transmitted to the nearest central office (CO) (part of PSTN 52, FIG. 2) along with a call set-up message (FIG. 2, 254). The local exchange CO comprises one or more carrier class switches (not shown), which take calls and routes the calls to the proper destination based on the dialed number. If the call is a long distance call, the call goes from the local CO to a long distance carrier's class switch on route to the local CO nearest the called party. The call set-up message (FIG. 2, 254; FIG. 3, 371) for a call sent over the various switches is governed by standards, which are particular to the network in use.

As shown in FIG. 2, the local CO (which is part of the PSTN 52) locates the remote end-point 253 using the dialed telephone number. Once the CO locates the remote end-point 253, the CO sends a call set-up message 254a to the remote end-point 253 as shown in FIG. 2. If the remote endpoint 253 is on and not busy (FIG. 3, 372), an alerting (ringing) signal 256a is sent back to the CO and the CO forwards the alerting (ringing) signal 256 to the calling party 250. The alerting signal tells the calling party the remote endpoint 253 has not answered the call. As shown in FIG. 3, once the called party goes off-hook, i.e., answers the telephone, the telephone at the remote endpoint (FIG. 2, 253) sends a call-connect message (FIG. 3, 357) to the CO. The CO forwards the call-connect message 257 to the calling party (FIG. 2, 251). Now the two endpoints will begin transmitting voice or data between them over the PSTN (FIG. 3, 376, 377). A call termination message is sent by either the calling party or called party to disconnect, i.e., terminate the call (FIG. 2, 258, 258a, 259a, 259; FIG. 3, 378).

As shown in FIG. 2, the remote endpoint maybe unavailable to answer the call. That is, the telephone is turned off, not connected, or busy, or the called party simply does not answer the call (FIG. 2, 262a; FIG. 3, 372). In this case, if the called party does not have a "follow-me" service (FIG. 3, 373), the call is diverted to a multi-media message storage system (e.g., voice mail system) and the call is answered by the multi-media message storage system (FIG. 2, 263a, 264a, 264). Once the calling party records the voicemail message (FIG. 3, 374), the calling party terminates the call (FIG. 2, 265, 265a, 266, 266a).

If the called party has a "follow-me" service (FIG. 3, 373), the CO diverts the call to a pre-defined next location (FIG. 3, 373) and tries to contact the called party at each "follow-me" number administered for called party. If the called party is not available at any of the "follow-me" numbers, the CO diverts the call to a multi-media storage system 274.

For IP desktop telephones (FIG. 1, 70) or softphones (FIG. 1, 80) sending calls via the Internet, using session initiation protocol (SIP) or H.323 protocol, the messages sent between the end-points to establish a call and set-up a communication channel are governed by the particular protocol in use. Regardless, the called party at the remote end-point is alerted to an incoming call by a standard ringing signal if the IP end-point is available (FIG. 3, 372). Once the call is answered by the called party, the appropriate establishment and connection messages (FIG. 3, 375) are sent via the Internet or over the data network. Otherwise the call is similarly diverted to a pre-defined next location (FIG. 3, 373), such as a "follow-me" number as administered in the service preferences, or a voice mail system (FIG. 3, 374).

Unfortunately, neither wireline or wireless telephone systems or even paging services currently allow the calling party to send a recorded or real-time data/bearer stream including voice, text, images or video attached to a call set-up message to initiate a telephone call and to provide information to the called party before the called party answers the telephone. For example, mobile phones enabled to send and receive SMS or MMS, the short message service (SMS) protocol allows mobile users to send short text messages and the multimedia message service (MMS) protocol allows mobile users to send multimedia messages. SMS also allows a mobile user to send short text messages to and receive text messages from email, paging services or informational services (such as receiving stock quotes). MMS adds images, text, audio clips and video to SMS messages. However, both SMS and MMS messages are not delivered in real time and hence cannot initiate a telephone call.

The mobile switch center (not shown) sends SMS messages to a mobile message service center (not shown). If the mobile phone user is available, the SMS message is immediately deliverable to the recipient and the mobile message center sends the message to the recipient. Otherwise, the message is stored in the mobile message service center until the mobile user is available.

The mobile switch center (not shown) sends MMS messages to a mobile message service center (not shown). The message service center sends the sender a message confirmation that the message was sent. The message service center then sends the recipient a message notification that a new message has arrived. The recipient can download the message immediately or later. Once the recipient has successfully downloaded the message, the sender gets a message delivered confirmation message.

For mobile phones that use polyphonic ring tone technology, the mobile telephone user can download various high quality tones and administer their user preferences to play a particular tone when a particular incoming call arrives. Alternatively, the mobile telephone user can record their voice and administer their user preferences to play the recording of their voice when a particular person is calling or for any incoming call. Note, these polyphonic ring tones are administered and recorded by the called party mobile telephone owner to play when a call is received from a calling party.

Current voice paging systems associated with telephones are typically used in a facility to broadcast messages to locate individuals or announce messages, such as emergencies or sales. When the paging system is used to locate individuals, the individual still needs to call back the person who initiated the page. The person initiating the page cannot use the paging system to initiate a telephone call to locate an individual. The person initiating the page cannot send a real-time data/bearer stream attached to a call set-up message to initiate a call and alert a called party before the called party answers the call.

SUMMARY

These and other needs are addressed by the various embodiments of present invention. The present invention generally forwards from a calling communication device to a called communication device a multi-media message from the first user of the calling communication device. The called communication device plays the message to the second user of the called communication device before the call is answered by the second user (or before a bi-directional communication path is established between the first and second users).

In a first embodiment of the present invention, a called party is alerted using a recorded or live voice, text, picture, holographic image or video multi-media message from the calling party. The calling party may send a voice message, for example, and attach it as a Multimedia Message Service or MMS message to a call set-up message or send it as a text-message, such as a Short Message Service or SMS message, and convert it into an audible message at the called communication device using text-to-speech conversion techniques. The message may be recorded beforehand, recorded as part of the dialing process, or sent 'live' instead of having the standard ring tone playing at the remote endpoint's telephone or communication device. The message may, for instance, be used to alert the called party to the caller's identity and provide additional, important information to the caller before the caller answers the call. The call maybe sent via the PSTN, an IP network such as the Internet or over a data network. Of course, if the calling and called party endpoints (i.e., telephones or other communication device) allow for text, images and video, the recorded or real-time data/bearer stream sent with the call set-up message to initiate the call may include text, images or video in addition to voice.

Hence if a calling party has an important message and wants to grab the attention of the called party who may not otherwise answer the telephone, the present invention will provide the called party with the important message without the called party answering the call. For example, if a calling party knows that the called party is driving and cannot answer the call, the calling party may record a voice message or send a real-time data/bearer stream, such as "Dear get some milk and bread on your way home tonight." Alternatively, the calling party wants to grab the attention of the called party, who may be near to the telephone to hear the ring, but is ignoring the standard ring tone. In this case, the calling party may record a voice message or send a real-time data/bearer stream, such as "Dear I apologize for starting the fight last night." The remote endpoint replies with an alerting message and plays the recorded message before the call is answered. Hence, the called party will hear the message instead of the standard ring tone normally heard when there is an incoming telephone call. The called party may answer the call or allow the call to divert to voice mail. When the called party answers, the standard call connect messages are sent as defined by the particular network protocol.

When the message is sent "live," a real-time data/bearer stream attached to a call set-up message may be sent, for example, over the PSTN to the CO. When the calling party endpoint receives the alerting message from the CO, the calling party endpoint opens a bearer channel, i.e., a channel that carries voice communications. Now the calling party begins to speak and the remote endpoint plays this live voice on its speaker. The called party hears the live voice and answers the call. Once the call is answered, the normal call connect messages are sent as defined by the particular network protocol.

The remote endpoint may be unavailable, i.e., the endpoint is not connected, shut-off, currently on another call or not answering the incoming call. In this case, the calling party call is diverted to a pre-defined next location, such as a "follow-me" number as administered in the called party service preferences, or the call is diverted to a voice mail system.

If the call is diverted to voicemail, the calling party is given the option to record a voicemail message. The voicemail message maybe an entirely new recording or include the recorded or real-time data/bearer stream (buffered by the PSTN, Internet, or data network) sent along with the call set-up message to initiate the call.

In a second embodiment of the present invention, the called party may administer a special introductory ring tone on his telephone or communications device to play when the called party receives a recorded message or real-time data/bearer stream from a calling party. After the special introductory ring tone plays, the recorded message or the real-time data/bearer stream plays before the called party answers the call. This special introductory ring tone may be administered to play for any calling party or for a particular calling party.

In yet another embodiment, when the called party endpoint is not available because the endpoint is busy, the recorded message or real-time data/bearer stream may be sent attached to a call-waiting signal. Where the called party hears the recorded or real-time data/bearer stream instead of the standard call-waiting signal.

In a further embodiment, the calling party and called party endpoints may publish and exchange information regarding multimedia capabilities. Once the endpoint multimedia capabilities are known, the calling party endpoint allows the calling party to record or send a live voice, text, image, or video message attached to a call set-up message to the called party.

In another embodiment, the calling party may decide not to make a new recording each time the calling party calls a particular person. For example, the calling party may use a standard recording most times the calling party calls their spouse.

The embodiments of the present invention can offer advantages over the prior art. By way of example, the present invention can convey valuable information to a callee or increase the likelihood of the callee answering the pending call. Although ring-tones and polyphonic ring-tones are currently in use, the ring-tones are unable to convey a voice message from the caller to the callee. Assigning a specific ring to a user (or user group) does not contain dynamic information relevant to the pending call only. Paging and multimedia message services can provide voice messages to a user but the user must thereafter initiate a separate call to the messaging party, possibly incurring the costs of the call. Moreover, the receiving party, unlike the present invention, must actively press a button to view the multi-media message service message.

BRIEF DESCRIPTION OF THE DRAWINGS

FIG. 4A is a diagram showing the RMS enabling of a communication device for one network configuration.

FIG. 4B is a diagram showing the RMS enabling of a communication device for another network configuration.

DETAILED DESCRIPTION

Figure 1A:
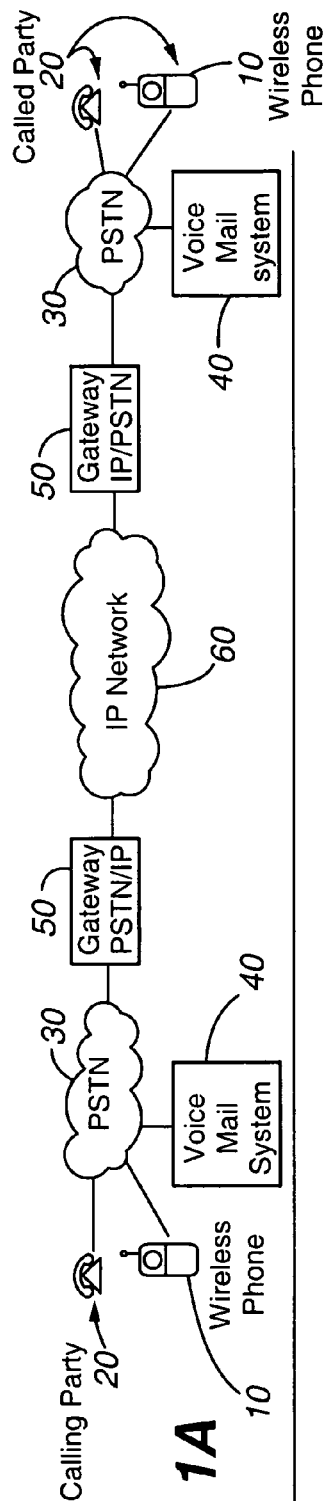
FIGS. 1A-C shows three examples of possible communication network configurations.
Figure 1B:
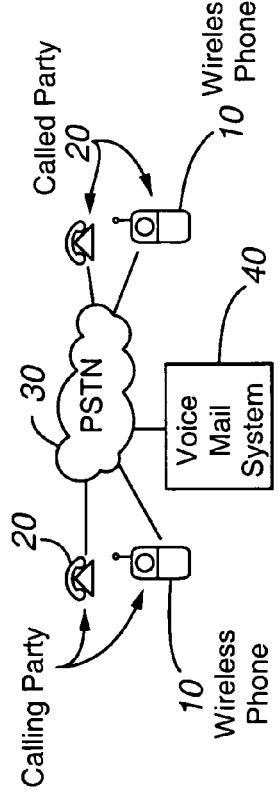

As discussed previously, FIGS. 1A, 1B and 1C are examples of three different network communication configurations. These network communication configurations are adaptable to enable the ring message service (RMS) agent, which includes a client and server software. The RMS agent is an application programming interface (API) that communicates with the underlying network through function calls to perform its function. The RMS agent enables the communication network to provide important information either, as voice, text, image or video from a calling party to a called party before the called party answers a telephone. The RMS agent (client or server) interfaces with the various components of the communications network, such as the communication device, to recognize two forms of message, the ring tone message (RTM), or live-RMS. The RMS agent allows the calling party to choose whether to record a RTM or send a live-RMS message attached to a call establishing message, such as, a call set-up message. To adapt these network communication configurations to enable the ring tone message service (RTMS) several changes are required to various components of the network communications configurations. The communication networks include the PSTN 30, IP network 60, mobile switch center (not shown), etc.

To RTMS enable the calling or called party endpoint communication devices, the RMS agent client (FIG. 4A, 418) is stored in the calling and/or calling party communication device (FIG. 4A, 10). The communication devices include wireless 10, satellite phones (not shown) or personal digital assistant (PDA) with telephony capability (not shown), wireline 20, such as analog 41, digital 42, ISDN 42, IP telephones 70, IP softphones 80, etc. The communication devices may embed the RMS agent client 418 as software stored in a storage device such as memory, flash card or hard-disk drive. Alternatively, the RMS agent client 418 may be incorporated in firmware or hardware. To facilitate the recording and storage of the RTM message or buffering of the live RMS message, the communication device 10 may use memory, flash card, or a hard-disk storage device. In the called party communication device 10, the RMS agent client 418 receives the RMS packet interfaces with the called party communication device 10 to play the RMS message.

The RMS agent client 418 interfaces with the RMS agent server logic 419 embedded in software residing in the communication network, such as the CO 412 (FIG. 4A) to allow a calling party to send and a called party to receive RMS messages. Alternatively, the RMS agent server 419 may be incorporated in firmware or hardware. As shown in FIG. 4A, communication device 20 communicates and interfaces with the RMS agent server 419 residing in CO 412 carrier class switch 413, 414 memory 416 and in long distance carrier switch 415 memory 417. Alternatively, the RMS agent server 419 may reside, for example in other storage devices such as a flash card (not shown) or hard-disk storage device (not shown) on the CO 412 carrier switch 413, 414 or long distance carrier switch 415.

The RMS agent client 418, for example, instructs the communication device 10 to store a RTM voice message in memory, i.e., a recording of a voice message beforehand or recording of a voice message as part of the dialing process. At the called party endpoint, the RMS agent client 418 plays the RTM voice message over the speaker before the called party answers the call instead of the called party endpoint playing the standard ring tone. If the called party endpoint 10 includes multimedia capability, the RMS agent client 418 interfaces with the communication device memory 411 to buffer and play any multimedia components of the RTM message.

Alternatively, the RMS agent client 418 may instruct the communication device 10 memory 411 to buffer a live RMS voice message as it is sent to the called party before the called party answers the call. The called party communication device 10, receives the live-RMS voice message. The called party communication device RMS agent client 418 buffers in memory 411 the received live voice message and plays the message over the speaker before the call is answered. If the calling party additionally sends text, images or video and the called party endpoint 10 includes multimedia capability, the called party endpoint RMS agent client 418 interfaces with the endpoint memory 411 to buffer the received live RMS multimedia components. The RMS agent client 418 also interfaces with the called party endpoint 10 to play the live RMS multimedia components.

The RMS agent client 418 may also create the RMS message, i.e., RTM message or the live-RMS message that is attached or associated with a call set-up message. RMS messages are subject to the same rules governing quality of service for the voice channel, such as conversion of an analog signal to a digital signal at the CO 412, PBX 36, or Gateway 450; encryption; echo cancellation, etc. Otherwise, if the communication device 10 does not include the RMS agent client 418, the communication device 10 interfaces with the RMS agent server 419 logic to create the RMS message. Likewise, RMS messages created by the RMS agent server 419 are subject to the same rules governing quality of service for the voice channel.

Figure 7:
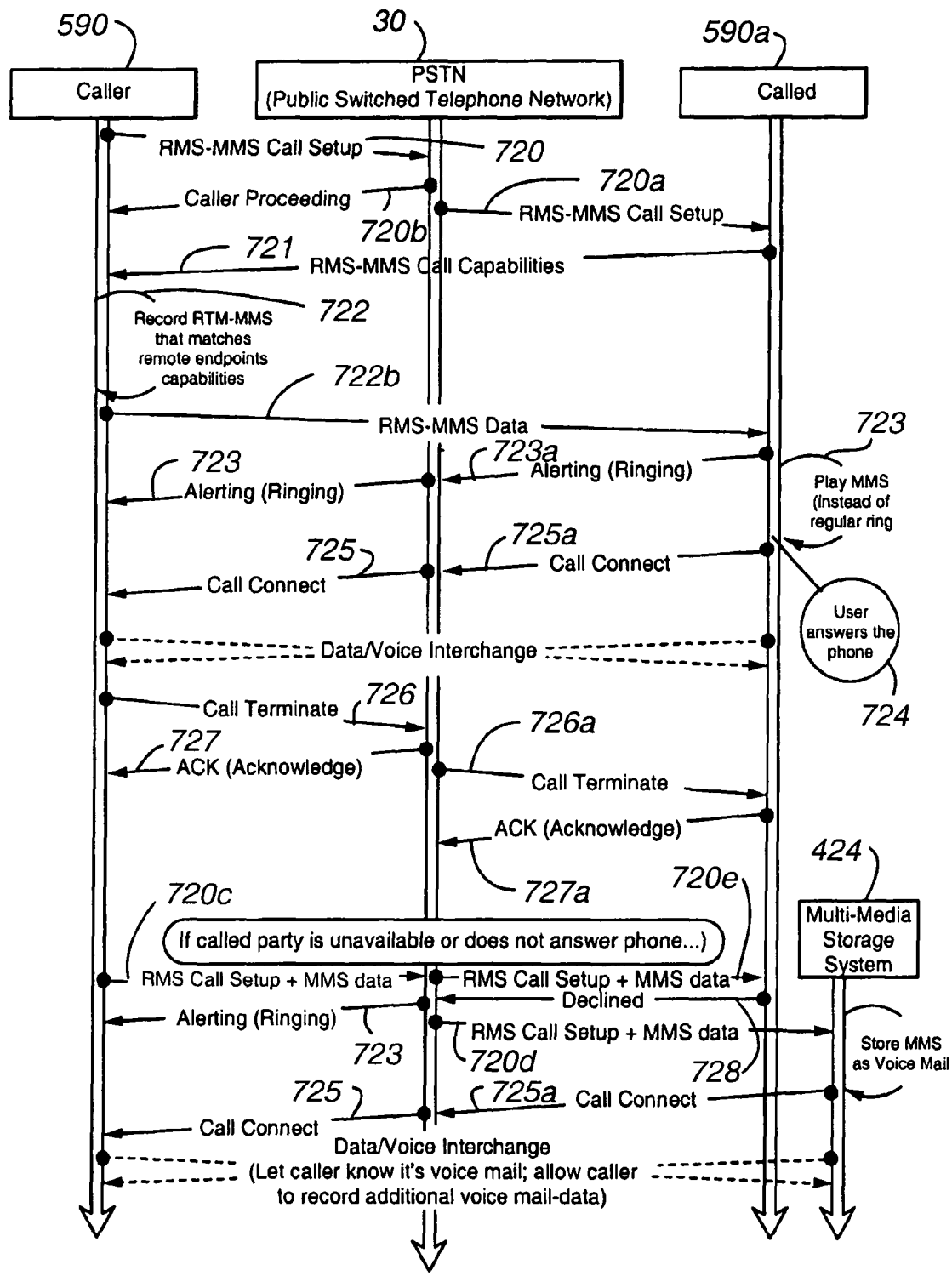
FIG. 7 is a diagram showing the call procedure allowing the endpoints to send an RTM message with multimedia components.

Some mobile phones 10 are multimedia messaging service (MMS) capable which allows the mobile telephone user to send and receive images, text, audio and video in a message. In an alternate embodiment, the calling party and called party RMS agent client 18 may negotiate endpoint multimedia capabilities. If both endpoints are MMS capable but the network 30, 60 is not capable of handling RMS messages with multimedia components, the RMS agent client 418 on both endpoints may agree to record a multimedia message as an MMS message rather than as a RMS message with multimedia components. In this case, the calling party endpoint will send the called party, a call establishment message, such as a RMS Call Set-up message (FIG. 7, 720). The MMS data is recorded (FIG. 7, 722) and sent (FIG. 7, 722b) after the endpoints exchange and negotiate multimedia capabilities (FIG. 7, 721). Although the network 60 is identified as the Internet in FIGS. 1A, 1C, and 4B, it is to be understood that the network can be any data network and may employ protocols other than the Transfer Control or Internet Protocols.

Similarly, some mobile phones 10 are short message service (SMS) capable which allows the mobile telephone user to additionally send and receive alphanumeric messages from mobile subscribers, email, paging and voice mail systems. If the calling party and called party RMS agent client 418 negotiate endpoint capabilities, both endpoints are SMS capable but the network 30, 60 or device 10 is not capable of handling a RMS text message, the RMS agent client 418 on both endpoints may agree to send the SMS message rather than convert the message to an RMS message with a text component. In this case, the calling party endpoint will send the called party, a call establishment message, such as a RMS Call Set-up message (not shown). The SMS message is sent after the endpoints exchange and negotiate multimedia capabilities. At the called party end, the SMS text message can be displayed on the mobile communication device 10 or a text-to-speech converter may be used to convert the text to speech for the mobile user.

In some cases, a communication device 20 may not be economically retrofitted to store the RMS agent client 418 or have sufficient memory to record or store an RTM message, or buffer a live RMS message. Additionally a calling or called party communication device may have the capability to receive and send voice but not the capability to receive one or More other multimedia components. In this case, a computer (not shown) that is integrated with the communication device 20 may be used to store the RMS agent client 418 in the computer's storage device, such as memory, flash card, or hard-disk storage. Similarly, the computer (not shown) associated with the communication device may be used to record and store the RTM message or buffer a live RMS message in the computer's storage device, such as memory, flash card, or hard-disk storage.

Alternatively, when the communication device 20 does not include the RMS agent client 418 or have sufficient memory to record or buffer an RMS message, the calling party 20 may purchase an RMS service plan from their local telephone company. This provides the calling party the same benefits a calling party has if they had a RMS enabled communication device 10 or at a minimum the capability to send a RTM voice message or live RMS voice message. The calling party may still administer the RMS service, at a minimum record and store a RTM voice message or buffer a live RMS voice message using the local network facilities 416.

To use this service plan, the calling party 20 may have an account requiring them to authenticate themselves with an account name and password. Once successfully authenticated, the calling party is presented menu options to allow the calling party to choose the RMS type of message they want to send that is, a RTM or live RMS message. For example, if the calling party chooses to send a RTM message, menu options will allow the calling party to record, delete a recorded message, or store an RTM message and dial the telephone number of the called party. If the calling party chooses to send a live RMS message, the calling party would choose the menu option that allows the calling party to dial the telephone number of the called party and to record and buffer a live RMS message. The calling party may respond to the menu options using dual tone multi-frequency (DTMF) keys from the telephone keypad or voice recognition services.

In an alternative embodiment, the communication device 10 may be capable of receiving and sending voice, text, images, and video. However, the calling party or called party may not have the capability to retrofit the communication device 10 to record or store a multimedia RTM message, or buffer a live RMS multimedia message. In this case, the calling or called party 20 may purchase an RMS service plan from their local telephone company to administer the RMS service, record or store a RTM multimedia message or buffer a live RMS multimedia message using the local network facilities 416. The account may require the calling or called party to authenticate themselves with an account name and password. Once successfully authenticated, the calling party is presented menu options to allow the calling party to choose the RMS type of message they want to send that is, RTM or live RMS message. For example, if the calling party chooses to send a multimedia RTM message, menu options will allow the calling party to record, delete a recorded message, or store an RTM message and dial the telephone number of the called party. If the calling party chooses to send a live RMS multimedia message, the calling party would choose the menu option that allows the calling party to dial the telephone number of the called party and buffer a live RMS multimedia message. As previously mentioned, the calling party may respond to the menu options using dual tone multi-frequency (DTMF) keys from the telephone keypad or voice recognition services.

The RMS agent client 418 has administrable features. For example, the called party may administer the RMS agent client 418 in the called party communication device 10. One administerable feature maybe whether to play the RTM once or even repeatedly before the called party answers the call. This administered parameter may be for an RTM received from any calling party or from a specific calling party. Hence, an RTM from a family member may be administered to play repeatedly whereas an RTM from the boss is played only once. Alternatively, the called party may administer this feature from his account on a RMS service plan provided by the local telephone company. Another administrable feature is to disable playing the RTM completely (e.g., repeatedly from family members, once from the boss, and never from the bank manager).

The called party may administer the RMS agent client 418 to record and store a special introductory ring tone on the communications device 10 to play when the called party receives a RTM or live RMS message. The RMS agent client 418 may play this special introductory ring tone before playing the RMS message from any calling party or from a specific calling party. Rather than the called party communication device 10 playing the standard ring tone for an incoming call. After the special introductory ring tone plays, the RTM or the live RMS message plays before the called party answers the call. Alternatively, the called party may administer this feature from his account on a RMS service plan provided by the local telephone company.

Some mobile telephones 10 play polyphonic ring tones. In this case, the RMS agent client 418 interfaces with the software, firmware or hardware that selects, records and plays the polyphonic ring tone. The called party may be allowed to administer the polyphonic ring tone to play as the special introductory ring tone on the communications device 10 prior to playing the RTM or live RMS message. Rather than the called party communication device 10 playing the standard ring tone for an incoming call.

In an alternative embodiment, the calling party may administer the RMS agent client 418 to use a previously recorded RTM stored in the communication device 10 memory 411 when calling a particular person. This allows the calling party to select a previously recorded RTM when the calling party dials a particular person. For example, the calling party may use a previously recorded RTM when calling their spouse to remind them to pick up the clothes from the dry cleaners.

Alternatively if the calling party has an RMS service plan, the previously recorded RTM may be stored on network facilities, such as in CO 412 carrier class switch 413, 414 memory 416 or in long distance carrier switch 415 memory 417. This allows the calling party to select a previously recorded RTM when dialing a particular person. As the calling party may administer the communication device 10, the calling party may administer the RMS agent server 419 to associate the previously recorded RTM to a called party when dialing the called party.

In another alternative embodiment, the calling party may administer the RMS agent client 418 or RMS agent server 419, if the calling party has an RMS service plan, to determine whether the called party endpoint is not available because the endpoint is busy. If the called party endpoint is not available because the endpoint is busy and the called party uses a call waiting service, the RMS agent may attach the RMS message to a call-waiting signal. In this case, the called party hears the recorded or real-time data/bearer stream instead of the standard call-waiting signal.

In another alternative embodiment, the calling party and called party endpoints may administer a feature that allows the RMS agent client 418 to exchange information regarding multimedia capabilities. The RMS agent server residing in the CO 412 memory 416 or long distance carrier switch 415 memory 417 is administered to assist in the exchange of information between endpoints. Once the calling party RMS agent client 418 knows the called party communication device 10 multimedia capabilities, the RMS agent client 418 may prevent the calling party from sending inappropriate multimedia components to the called party.

However, the called party communication device may have an associated resource, such as text-to-speech (TTS) or automatic speech recognition (ASR), residing, for example, on an associated computer. The associated computer may have an associated monitor. If the called party device is not capable to receive text or speech, the TTS or ASR resource may convert a multimedia component as administered by the called party. For example if the communication device is not text capable, the called party RMS agent client 418 will respond to the request for exchange of information and notify the calling party RMS agent client 418 that a text component in the RTM or live-RMS is receivable. The called party communication device 10 will not display the text. Instead, the called party RMS agent client 418 will interface with the TTS resource and convert the text-to-speech and play the speech to the called party before the called party answers the call. Alternatively, the called party communication device 10 may not display the text but the associated computer monitor will display the text.

Similarly if the communication device is not capable of playing speech, the called party RMS agent client 418 may respond to the request for exchange of information and notify the calling party RMS agent client 418 that a speech component in the RTM or live-RMS is receivable. The called party communication device 10 will not play the received speech. Instead, the called party RMS agent client 418 will interface with the ASR resource and convert the speech to a transcript of the speech and display the transcript to the called party before the called party answers the call.

Figure 1C:
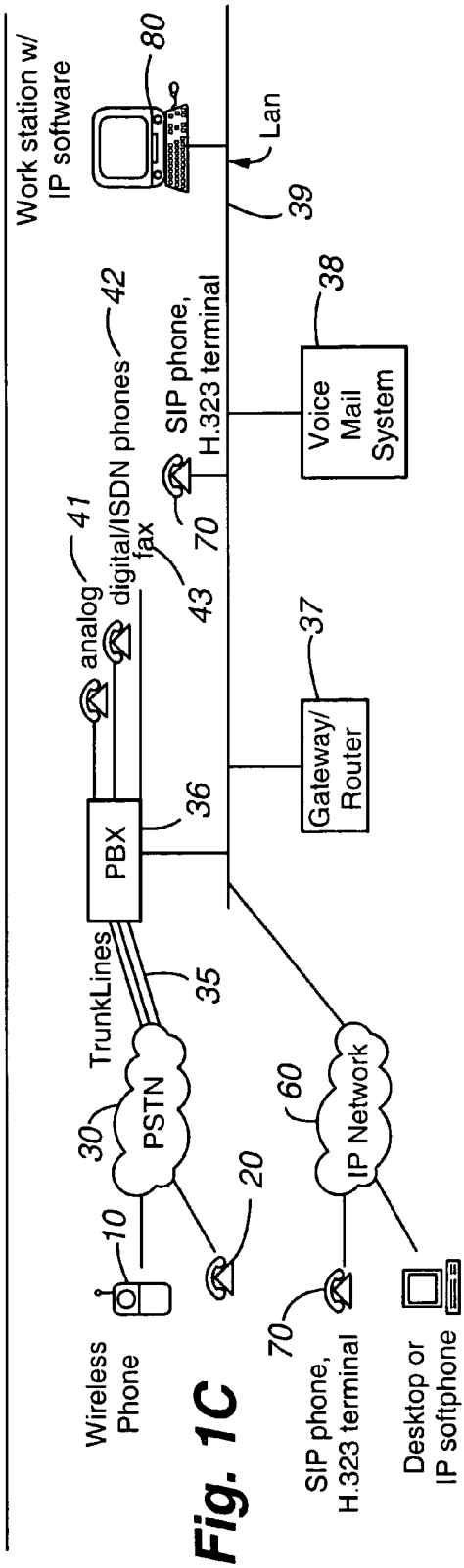
Figure 2:
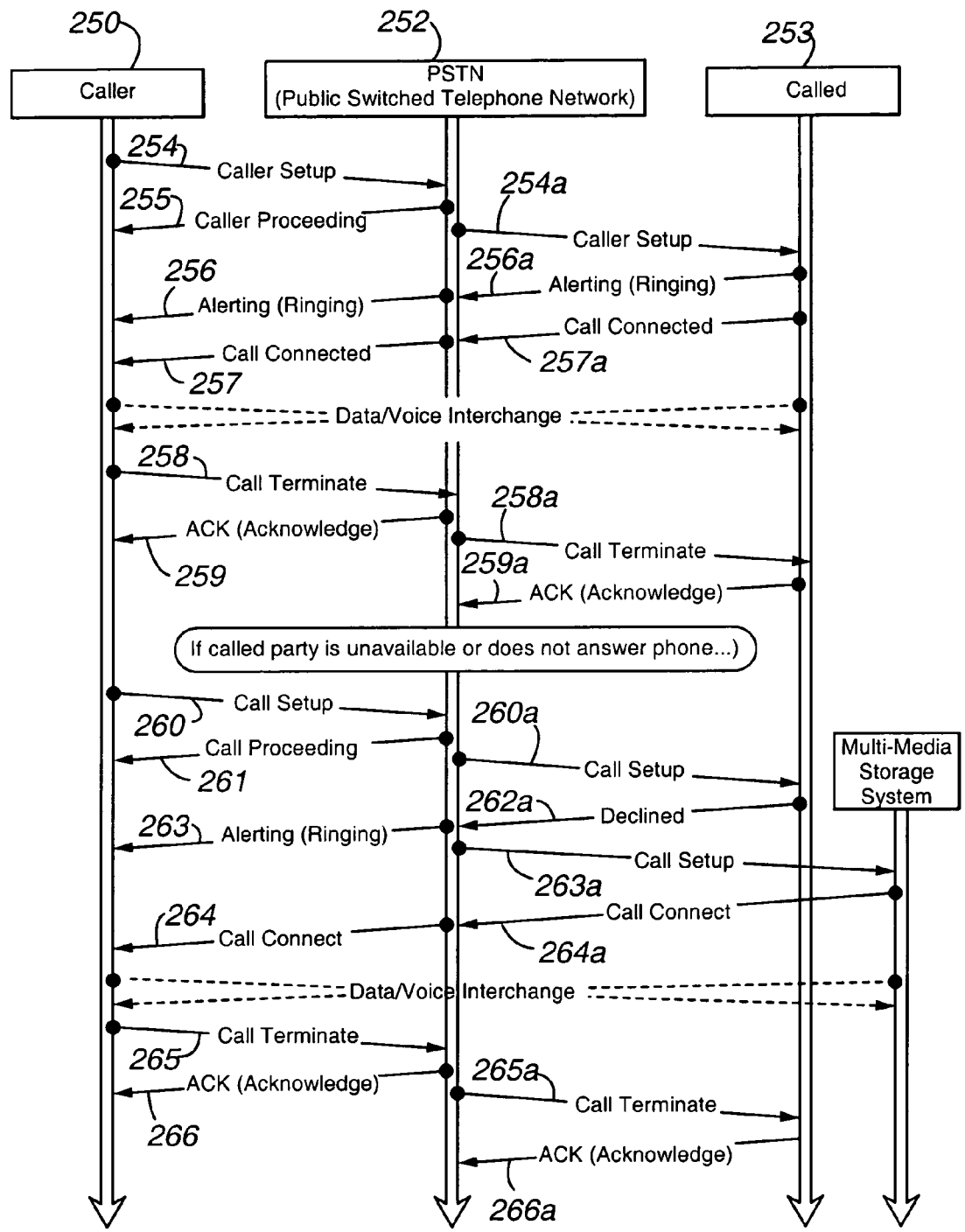
FIG. 2 is a diagram showing current call procedure messages sent over the PSTN.
Figure 3:
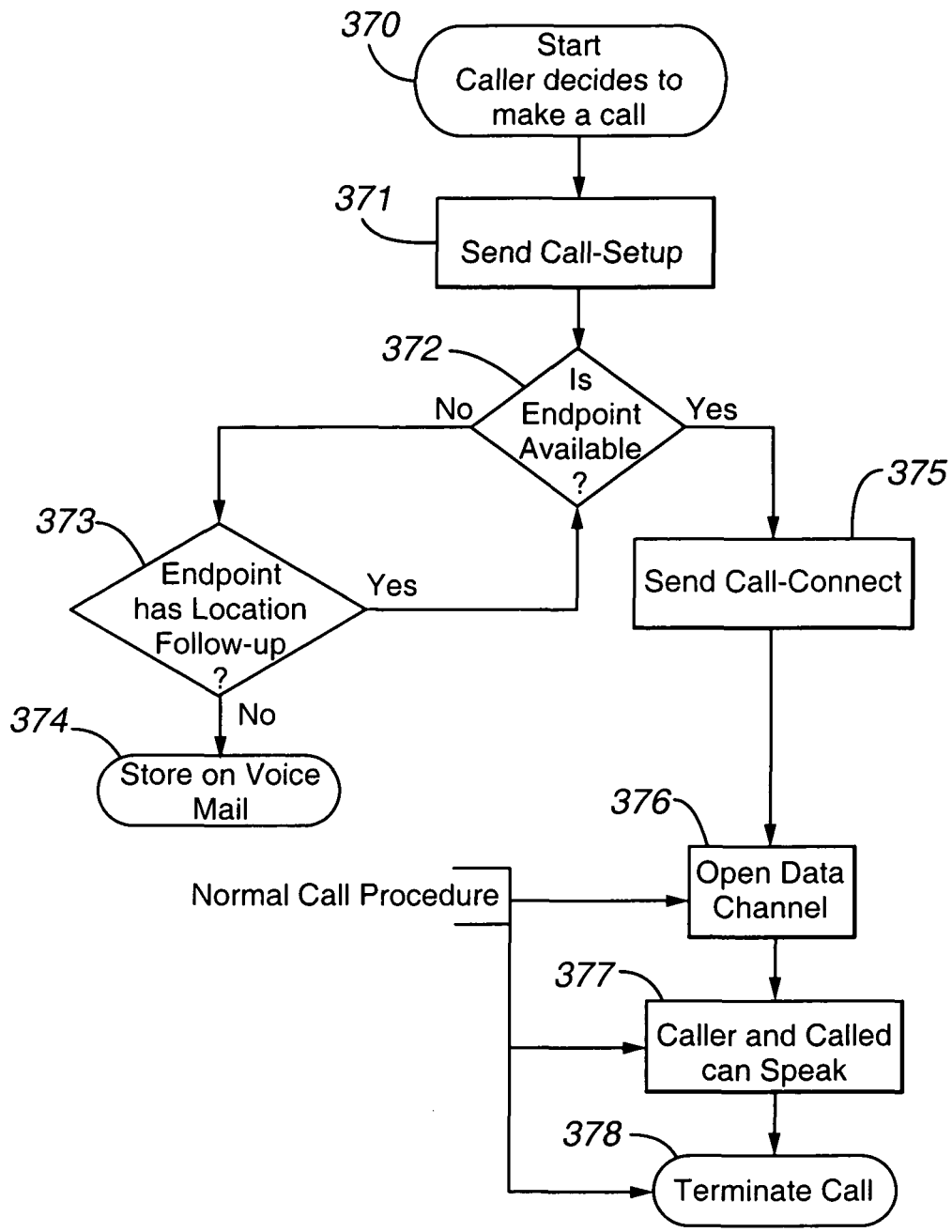
FIG. 3 is a high level flow diagram showing the method currently used to establish calls for wireline and wireless calls over the PSTN, Internet, or data network.

To RMS enable communication networks, such as the PSTN 30, Internet 60, or mobile switch center (not shown), the RMS agent server 419 interfaces with the network specific protocols used in the PSTN 30, Internet 60 or mobile switch center (not shown) to establish a RMS call and ensure the components of the RMS message are recognized and associated with the RMS call. As shown in FIG. 4A, the RMS agent server 419 is located in the CO 412 carrier class switch 413, 414 memory 416 or in the long distance carrier switch 415 memory 417. FIG. 4B shows a communication network that routes a call from the PSTN 30 to the Internet 60 to save on long distance toll charges. At the remote end, the call is routed to the PSTN 30 to the called party. In this case, a RMS agent server 423 additionally resides on the near and remote end Gateway 450 memory 422. The RMS agent server 423 ensures the RMS message is routed with the call through the Internet to the appropriate Gateway 450 and PSTN 30 at the remote end. For a wireless communication network, the RMS agent server may reside in memory within the mobile switch center (not shown). To RMS enable the enterprise communication network as shown in FIG. 1C, the RMS agent server (not shown) resides in PBX 36 storage device, such as memory, flash card, or hard disk-drive (not shown).

There is no requirement the RMS agent server 419, 423 is stored in memory, hence the RMS agent server 419, 423 may be stored in a storage device, such as flash card or a hard-disk drive. Alternatively, the RMS agent server 419, 423 may be incorporated in firmware or hardware.

To facilitate the recording of the RTM message or buffering of the live RMS message until the called party answers the call, the PSTN 30, Internet 60, or data network 39 may include storage devices such as additional memory, flash card, or hard-disks. If the call is forwarded to the follow-me service, the RMS agent server 419, 423 interfaces with the network specific protocols to ensure the RTM or live RMS message is temporarily stored on the network during the period the follow me service is dialing other contact numbers administered in the called party's preferences. If the call is diverted to voicemail, the RMS agent server 419, 423 interfaces with the network specific protocols to ensure the RTM or live-RMS message is temporarily stored on the network until the calling party terminates the connection with the multi-media message storage system 24.

The RMS agent server 419, 423 interfaces with the network specific protocols to allow the RTM or the live-RMS to be sent and received in-band, i.e., within the same channel (e.g., time slot or connection), as the signaling information. When required the RMS agent server 419, 423 interfaces with the network specific protocols to allow the RMS message be sent out-of-band, i.e., a different channel (e.g., time slot or connection) is used for signaling and voice transmission. For those communication network protocols in the PSTN 30 that require out-of-band signaling, the RMS agent server 419, 423 interfaces with the network specific protocol to open a short lived bearer (i.e., voice) channel between the calling party endpoint and PSTN 30. Additionally, the RMS agent server 419, 423 interfaces with the network specific protocol to open a short lived bearer (i.e., voice) channel between the PSTN 30 and the called party endpoint to send the RTM or live-RMS to the called party. Otherwise, if the voice and signaling information are sent within the same channel, i.e., in-band, the RMS agent server 419, 423 interfaces with the network specific protocol software to include the RTM or live-RMS message as part of the call set-up message.

For an Internet 60- or data network, such as a LAN (FIG. 1, 39), call establishment messages are control messages and are not sent together with the voice transmission, i.e., this is out-of-band signaling. In this case, the RMS agent in the PBX (not shown) interfaces with the Internet Protocol (IP) call establishment messages to ensure the IP network recognizes the additional separate packets containing the RTM voice message or live-RMS voice data.

To RMS enable the multi-media message storage system (FIG. 4A, 4B, 424), the multi-media message storage system includes the RMS agent client logic 426 stored in memory 425. Of course, the RMS agent client 426 may be stored in other storage devices, such as a flash card or hard-disk space. The multi-media message storage system 424 includes the storage facility, such as hard-disk space to store RTM or live RMS voice messages along with RTM or live RMS multimedia messages.

The RMS agent client 426 assists the multi-media message storage system 424 operational software and hardware (not shown) to recognize RMS messages, such as voice or multimedia. Additionally, the RMS agent client 426 interfaces with the multi-media message storage system 424 operational software (not shown) to provide RMS menu options. These menu options provide the calling party the option to record a voicemail message without the RTM or live-RMS message, or record a voicemail message and include the RTM or live-RMS message as part of the voicemail message. If the voicemail message includes the RTM or live-RMS, the RMS agent client 426 interfaces with the multi-media message storage system 424 operational software (not shown) to receive and store the recorded RTM or live-RMS along with the voicemail message. Once the voicemail message is recorded, the called party is sent a notification that they have a new message in the multi-media message storage system 426.

When the called party retrieves the voicemail message, the RMS agent client 426 interfaces with the multi-media message storage system 424 operational software and provides the RMS retrieval menu options. One menu option may allow the called party to retrieve the RTM or live-RMS message separate from the voicemail message or as part of the voicemail message.

For consumers that use an telephone answering machine to record voicemail messages rather than pay for voicemail service from a communication service provider, the telephone answering machine may answer the call and simply record a voice message from the calling party. A RMS enabled telephone answering machine may buffer and store the RTM or live-RMS and record a new voice message from the calling party.

For mobile telephone users that have SMS or MMS enabled on their phones, the RMS agent server 419 on the mobile message service center (not shown) may convert the RTM or live-RMS message to an MMS message. The RMS agent server 419 may then stored the converted message in the mobile message service center.

Figure 4C:
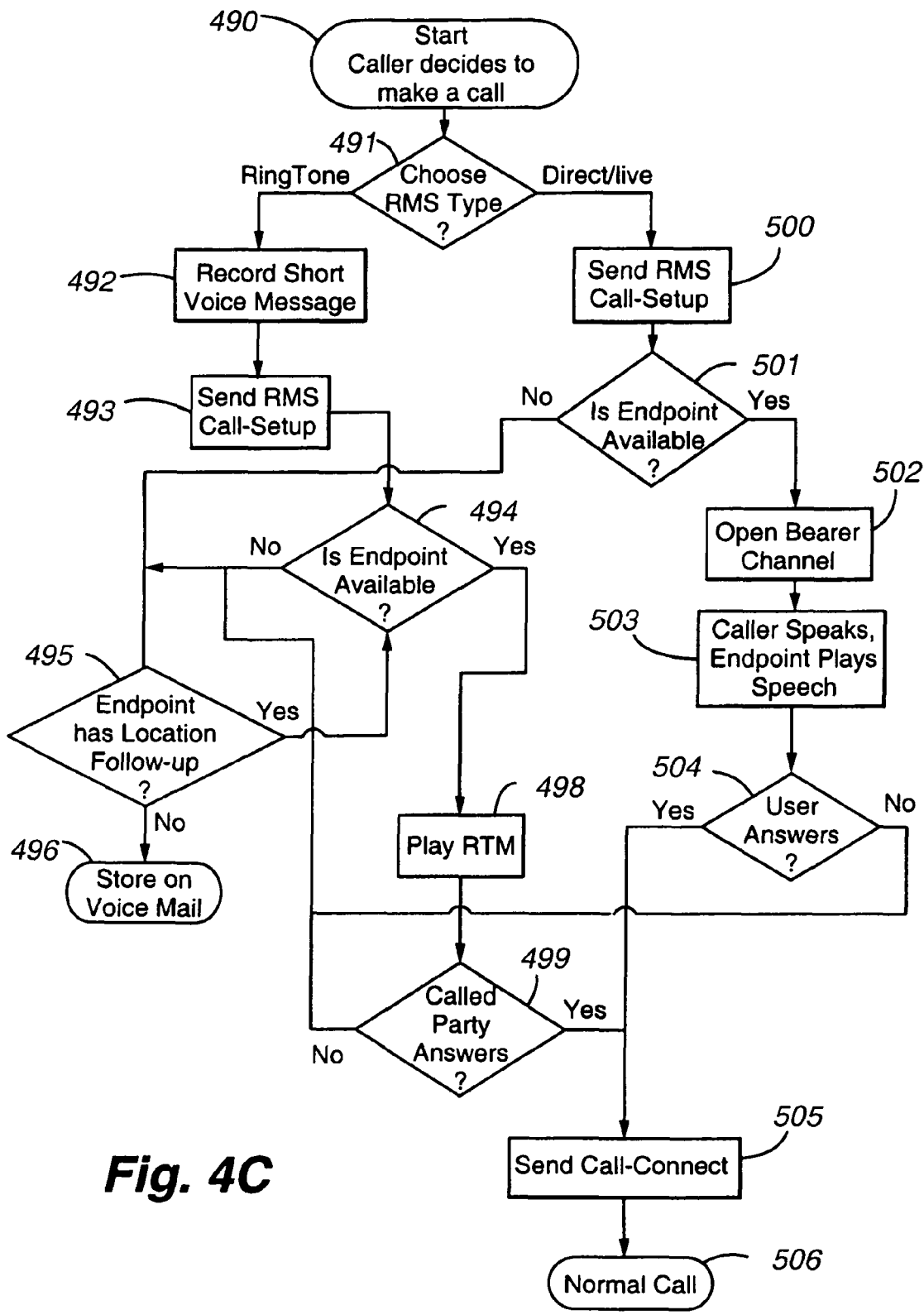
FIG. 4C is a high level flow diagram implementing the present invention for alerting a called party using a recorded voice or live voice from the calling party.
Figure 5:
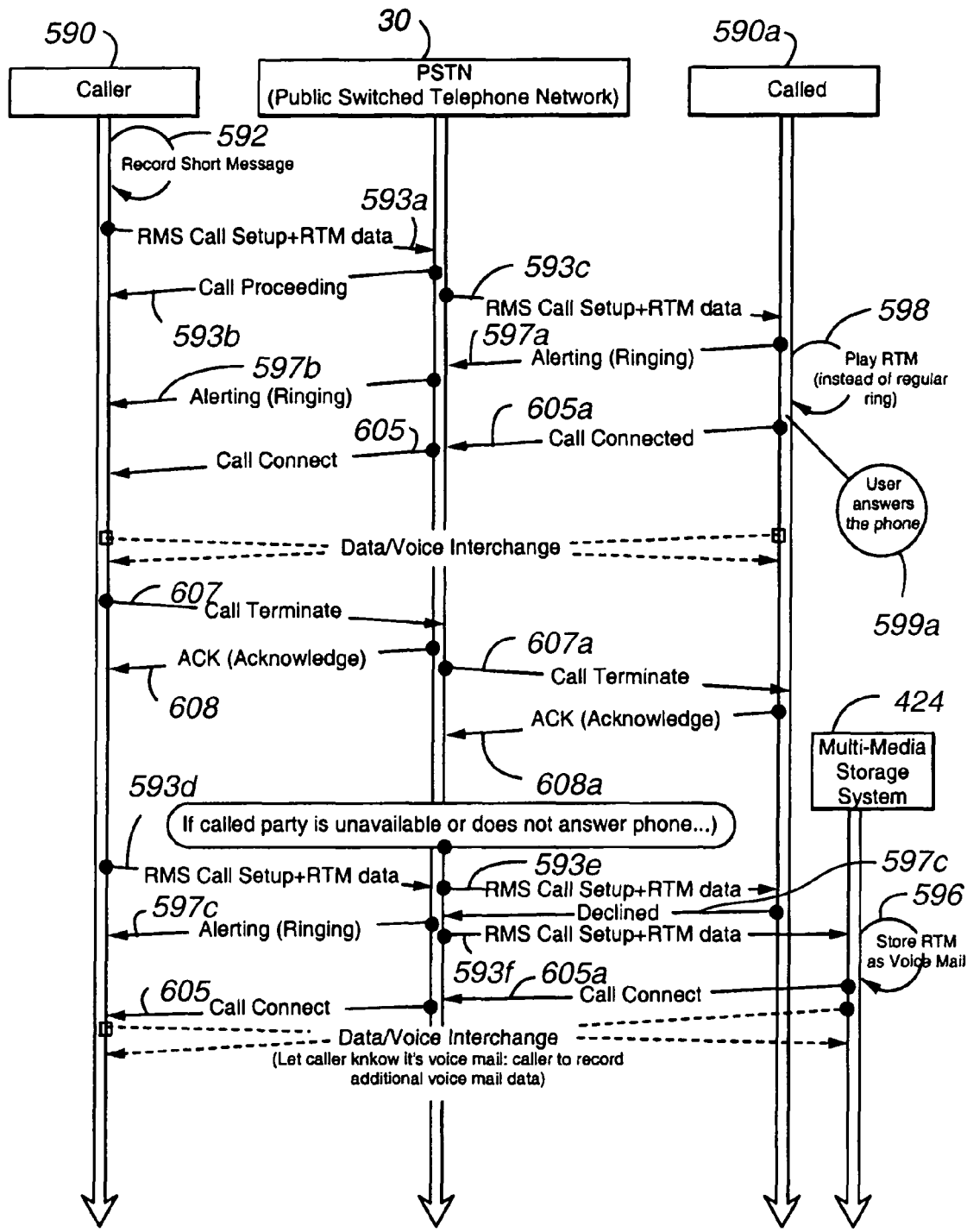
FIG. 5 is a diagram showing the call procedure to send a ring-tone message (RTM) and a call set-up message over the PSTN.

FIG. 4C is a high level flow diagram implementing the present invention for alerting a called party using a recorded RTM or live RMS voice message from the calling party. In step 490, a calling party, for example Alice, decides to make a call on a RMS enabled network by dialing a telephone number, for example Bob's. In step 491, Alice decides to send either an RTM 492 or live RMS voice message 500. If Alice decides to send a RTM voice message 492, Alice records a short voice message using an RMS enabled telephone. (FIG. 4C, step 492; FIG. 5, step 592). For example, Alice records a message to Bob saying "Bob this is your wife. Pick up the telephone." Alternatively, if Alice does not have an RMS enabled telephone but does have a RMS service plan, Alice may log into their RMS account to record and send an RTM voice message. Similarly, if Alice does have a computer integrated with their telephone that does have the RMS agent client (not shown), then Alice may record and send an RTM voice message over the PSTN 30. (FIG. 5). Alternatively, this recorded voice message may be attached to a call establishment message with Bob's telephone number and sent over the Internet 60, data network 39, or mobile switch center (not shown) to Bob's telephone.

In step 493, the RMS enabled phone sends a call set-up message to the local CO (FIG. 4A, 412) within the PSTN 30. The call set-up message includes the RMS Call Set-up and RTM data, such as the dialed telephone number and the voice message. (FIG. 5, 593*a*) This call set-up message, the RMS Call Set-up and RTM message, is sent from the PSTN 30 to the called party endpoint 590*a*, for example Bob. (FIG. 5, 593*c*) At the called party endpoint 590*a*, an alerting (ringing) signal (FIG. 5, 597*a*) is sent to the local CO (FIG. 4A, 412) within the PSTN 30 to notify the CO 412 (or caller) that the remote endpoint is available and alerting the called party (Bob) to the incoming call (ringing). (FIG. 4C, 494). The PSTN 30 forwards the alerting (ringing) signal (FIG. 5, 597*b*) to Alice's telephone to notify Alice that Bob's telephone is available. Meanwhile instead of Bob hearing the regular ring tone, Bob hears the RTM voice message recorded by Alice, "Bob this is your wife. Pick up the telephone," over his telephone speaker. (FIG. 4C, 498; FIG. 5, 598). Depending on administerable RMS features, Bob's telephone may start playing the RTM voice message once or repeatedly on the speakers until Bob answers the call, the call gets diverted to a "follow me" service, or diverted to voicemail 424. Alternatively Bob may just send the call straight to voicemail 424 once he hears the RTM voice message. For example, Bob may want to hear a RTM voice message repeatedly from his wife but not from his ex-wife.

If Bob answers the call (FIG. 4C, 499), a call connect message is sent (FIG. 4C, 505; FIG. 5, 605*a*, 605) and a call is established between Bob and Alice (FIG. 4C, 506). If either Alice or Bob terminates the call, i.e., hangs-up, a call terminate message is sent from the endpoint that terminated the call (FIG. 5, 607) to the remote endpoint (FIG. 5, 607*a*). An acknowledgement is returned from the remote endpoint (FIG. 5, 608*a*) to the endpoint that terminated the call (FIG. 5, 608).

If the called party endpoint (FIG. 5, 590*a*) is not available, i.e., the telephone is busy, off, or not answering, and Bob has a follow-me service (FIG. 4C, 595), the PSTN 30 will attempt to reach Bob by dialing each administered follow-me numbers. If Bob does not answer the call made to the "follow-me" contact numbers, the call is transferred to voicemail 424. (FIG. 4C, 496).

When a called party endpoint is unavailable, a declined message (FIG. 5, 597*c*) is sent to the local CO (FIG. 4A, 412) within the PSTN 30. The local CO (FIG. 4A, 412) sends an alerting (ringing) signal (FIG. 5, 597*e*) to the calling party 590 to notify the calling party that the called party (FIG. 5, 590*a*) has not answered the call. The local CO (FIG. 4A, 412) diverts the call to voicemail 424. The local CO (FIG. 4A, 412) sends the RMS Call Set-up and RTM data, i.e., called party telephone number and voice message. (FIG. 5, 5930. A call connection is established between Alice and the multi-media message storage system. (FIG. 5, 605, 605*a*).

The RTM voice message may be stored as part of the stored voicemail message. (FIG. 4C, 496; FIG. 5, 496). If the RTM voice message is stored in the multi-media message storage system (FIG. 5, 596), Alice could decide to hang-up knowing Bob will hear the RTM. Alternatively, the multi-media message storage system 424 may allow Alice to delete the RTM and just record a voicemail message or allow Alice to keep the RTM and attach it to the voicemail message. If Bob has a telephone answering machine depending on the sophistication of the telephone answering machine, it may not record the RTM but allow Alice to record a voicemail message. Once Alice has recorded and saved the recorded voice message and hung-up, the call is terminated.

Figure 6:
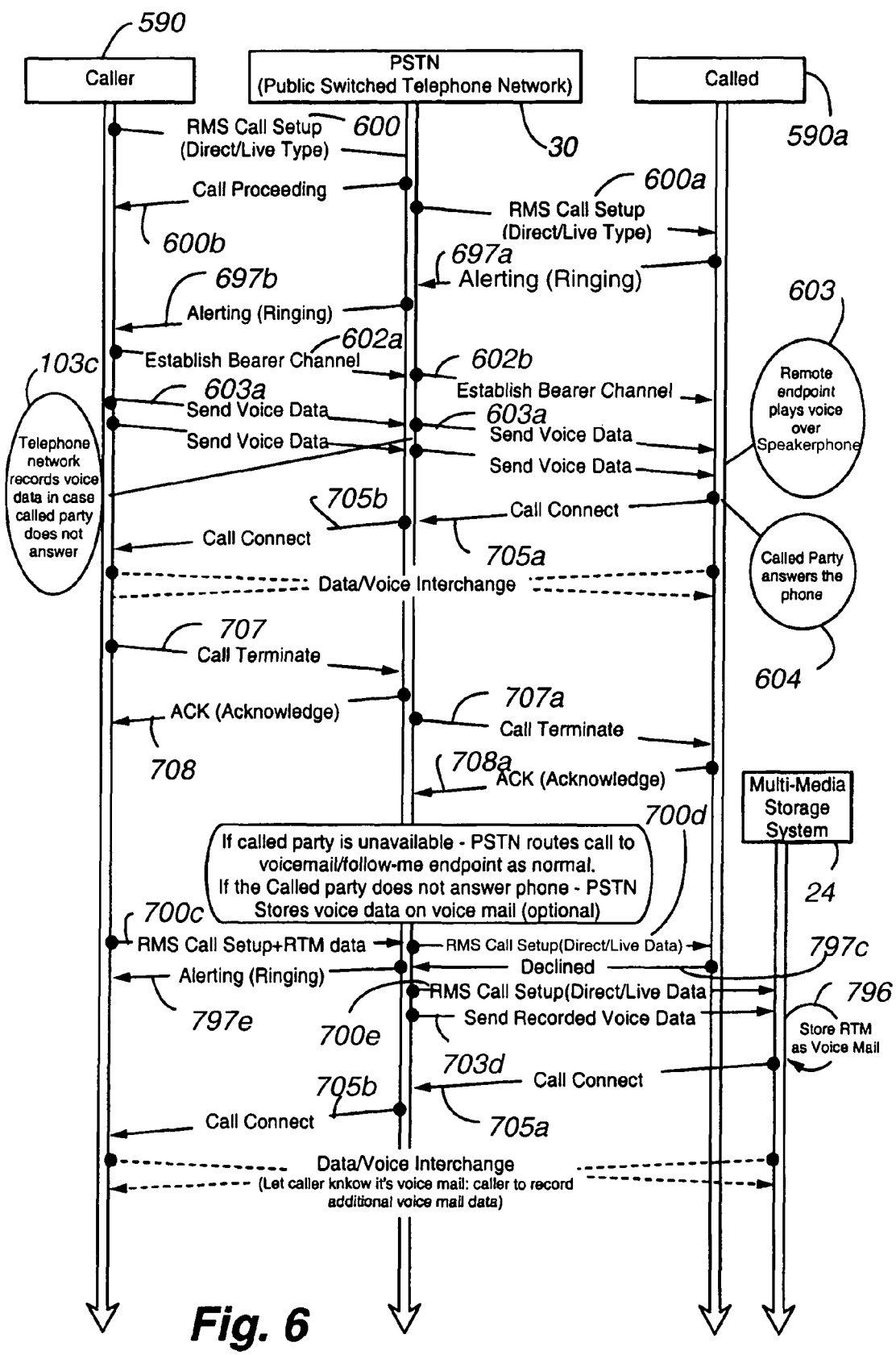
FIG. 6 is a diagram showing the call procedure to send a live RMS and a call set-up message over the PSTN.

Alternatively if Alice decides in step 491 to send a live RMS voice message on a RMS enabled telephone, a RMS call set-up message is sent. (FIG. 6, 600). If Alice does not have a RMS enabled telephone but does have a RMS service plan, Alice may log into her RMS account to record and send a live RMS voice message. Similarly, if Alice does have a computer integrated with their telephone that has the RMS agent client, then Alice may send a live RMS voice message over the PSTN 30. (FIG. 6). Alternatively, a live RMS voice message may be attached to a call establishment message with Bob's telephone number and sent over the Internet 60, data network 39, or mobile switch center (not shown) to Bob's telephone.

In FIG. 6, step 600, the RMS enabled telephone sends a RMS call set-up message to the local CO (FIG. 4A, 412) within the PSTN 30. The RMS call set-up message includes the RMS Call Set-up data, such as the dialed telephone number. The RMS Call Set-up is sent from the PSTN 30 to the called party endpoint 590*a*, for example Bob. (FIG. 6, 600*a*) At the called party endpoint 590*a*, an alerting (ringing) signal (FIG. 6, 697*a*) is sent to the local CO (FIG. 4A, 412) within the PSTN 30 to notify the CO 412 that Bob has yet to answer the call. (FIG. 4C, 501). The PSTN 30 forwards the alerting (ringing) signal (FIG. 6, 697*b*) to Alice's telephone to notify Alice that Bob has not answered the call. From the calling party endpoint, a bearer channel, i.e., voice connection, is established to the called party endpoint. (FIG. 4C, 502; FIG. 6, 602*a*, 602*b*). At this point Alice can start speaking since the voice data is sent over the bearer channel to the called party endpoint 590*a*. (FIG. 4C, 503, FIG. 6, 603*a*, 603*b*). The CO (FIG. 4A, 412) may record the voice data in case the called party does not answer the call. (FIG. 6, 603*c*). Note if the live RMS voice message is sent over the Internet 60, data network 39 or mobile switch center (not shown), an equivalent to the bearer channel is established so that the live voice data can be sent over these communication networks.

Meanwhile instead of Bob hearing the regular ring tone, Bob hears the live voice message spoken by Alice over his speaker. (FIG. 4C, 503; FIG. 6, 603). For example, "Bob its your wife. Are you there? Could you please pick up the telephone its very important. Its about dinner tonight. . . . ") and her live speech is played on Bob's telephone speaker until either Bob answers the call, the call is diverted to a "follow me" number or the call goes to voicemail 424. If Bob answers the call (FIG. 4C, 504), a call-connect message (FIG. 4C, 505; FIG. 6, 705*a*, 705*b*) is sent from Bob's telephone. The CO (FIG. 4A, 412) deletes the temporarily recorded voice data.

If either Alice or Bob terminates the call, i.e., hangs-up, a call terminate message is sent from the endpoint that terminated the call (FIG. 6, 707) to the remote endpoint (FIG. 6, 707*a*). An acknowledgement is returned from the remote endpoint (FIG. 6, 708*a*) to the CO (FIG. 4A, 412) within the PSTN 30 and from the CO (FIG. 4A, 412) to the endpoint that terminated the call (FIG. 6, 708).

If the called party endpoint (FIG. 6, 590*a*) is not available, i.e., the telephone is busy or off, and Bob has a follow-me service (FIG. 4C, 495), the PSTN 30 will attempt to reach Bob by dialing each administered follow-me numbers. If Bob does not answer the call made to the "follow-me" contact numbers, the call is transferred to voicemail 424. (FIG. 4C, 496).

When a called party endpoint is unavailable, a declined message (FIG. 6, 697*c*) is sent to the local CO (FIG. 4A, 412) within the PSTN 30. The local CO (FIG. 4A, 412) sends an alerting (ringing) signal (FIG. 6, 697*e*) to the calling party 590 to notify the calling party that the called party (FIG. 6, 690*a*) endpoint has not answered. The local CO (FIG. 4A, 412) diverts the call to voicemail 424. The local CO (FIG. 4A, 412) sends the RMS Call Set-up message along with the recorded speech to the voice mail system. (FIG. 6, 603*d*). A call connection is established between Alice and the multi-media message storage system. (FIG. 6, 705, 705*a*). As will be appreciated, signal 697*e* may be omitted; that is, the caller would not hear ringing but would be transferred directly to voicemail.

The recorded RMS voice message may be stored as part of the stored voicemail message. (FIG. 4C, 496; FIG. 6, 603*d*). If the recorded RMS voice message is stored in the multi-media message storage system (FIG. 6, 696), Alice could decide to hang-up knowing Bob will hear the recorded RMS voice message. Alternatively, the multi-media message storage system 424 may allow Alice to delete the recorded RMS voice message and just record a voicemail message. For example, "Bob it's me give me a call when you can." Alternatively Alice may keep the recorded RMS voice message and attach it to the voicemail message. If Bob has a telephone answering machine depending on the sophistication of the telephone answering machine, it may not record the RMS message but allow Alice to record a voicemail message. Once Alice has recorded and saved the recorded voice message and hung-up, the call is terminated.

FIGS. 4C, 5 and 6 show a RTM or live RMS voice message sent over an RMS enabled PSTN 30 network. However, nothing limits the RTM or live RMS message to voice. In an alternative embodiment, if the calling party sends a live RMS message with multimedia components, the CO 412 stores the live RMS message with multimedia components just in case the called party does not answer the call. If the called party 590*a* has a telephone with multimedia capability, the called party 590*a* may receive all of the multimedia components of the live RMS message. Instead of the standard ring tone to alert the called party to the incoming call, the live-RMS message with multimedia components will play on the called party's telephone. The live RMS message plays until the called party answers the call or the CO 412 diverts the call to the multi-media message storage system 424. Of course, if the called party uses a "follow-me" service, the CO 412 transfers the call along with the live-RMS message with multimedia components to the administered follow-me numbers. If the called party does not have a "follow-me" service or the call is not answered using any of the contact numbers in the "follow-me" service, the call and live-RMS message with multimedia components are transferred to voicemail 424.

If the call is diverted to voicemail 424, the live-RMS message with multimedia components may be stored as part of the voicemail message. Alternatively, the multi-media message storage system 424 may allow the calling party to delete the recording of the live-RMS message with multimedia components and just record a voicemail message. Similarly, the multi-media message storage system may allow the calling party to attach the recording of the live-RMS message with multimedia components to the voicemail message. If the called party has a telephone answering machine depending on the sophistication of the telephone answering machine, it may not record the live-RMS message with multimedia components but allow the calling party to record a voicemail message.

However, if the called party uses a MMS enabled mobile service, the live-RMS message with multimedia components may be converted to a MMS message and stored in the mobile telephone message service center as an MMS message.

FIG. 7 shows an embodiment of the present invention where a RTM message may include multimedia components, such as text, image and video. In this embodiment, the communication device 10 may be a RMS and MMS enabled mobile telephone or a RMS and SMS enabled mobile telephone. Where the RTM message includes the MMS or SMS message component to create the RMS MMS message. Alternatively in this embodiment, the calling and called party may have RMS enabled telephones with multimedia capabilities, such as text and/or image and/or video.

To initiate the call, the calling party 590, dials the called party's 590*a* telephone number. A RMS-MMS Call Set-up message 720 including the dialed telephone number and a request for information regarding multimedia capabilities at the remote endpoint is sent to the local CO 412 within PSTN 30. The local CO 412 returns a Call Proceeding message 720*b* to the calling party 590 and sends the RMS-MMS Call Set-up message to the called party endpoint 590*a*. The called party endpoint 590*a* responds with a RMS-MMS Call Capabilities message 721 that includes the multimedia capabilities of the called party telephone.

At the calling party endpoint, the RMS enabled telephone allows the calling party to record and send a RTM message which includes the multimedia components that match the called party's telephone multimedia capabilities 722. This recorded RTM message is sent in a RMS-MMS data message 722*b* to the called party endpoint 590*a*. The called party endpoint 590*a* responds by returning an alerting (ringing) signal 723*a* to the called party local CO 412. The called party local CO 412 sends the calling party local CO 412 the alerting (ringing) signal. The calling party local CO 412 sends the calling party the alerting (ringing) signal 723 to notify the calling party 590 that the called party telephone has not yet answered.

At the called party endpoint, the recorded RMS MMS message, i.e., RTM message with multimedia components, the RTM with MMS components, or RTM with SMS component plays 723 instead of the standard ring tone to alert the called party of the incoming call. The recorded RTM with multimedia components, MMS or SMS message will play once or repeatedly on the called party's telephone depending how the called party administered the RMS agent client 418 on his telephone.

If the called party answers the call 724, the called party endpoint 590*a* sends the Call Connect message 725*a* to the local CO 412 which sends the message to the calling party local CO 412. The calling party local CO 412 sends the Call Connect message 725 to the calling party 590 to establish the call between the calling party and the called party. When either the calling party or called party hangs up, i.e., terminates the call, a Call Terminate message 726 is sent from the endpoint that terminated the call to the local CO 412. The local CO 412 sends an Acknowledge message 727 to the party that terminated the call and sends the Call Terminate message 726*a* to the remote endpoint to notify the remote endpoint the other party terminated the call. The remote endpoint sends an Acknowledge message 727*a* to the local CO 412.

If the called party is unavailable, i.e., the telephone is busy or off, or does not answer the telephone, the called party endpoint 590*a* sends a Declined message 728 to the calling party local CO 412. The calling party local CO 412 sends the calling party an Alerting (Ringing) signal 723 to notify the calling party that the called party has not answered the telephone. The calling party local CO 412 sends a RMS Call Setup Message with the recorded multimedia message or the MMS message 722 to voice mail system 424. The multimedia message storage system 424 stores the recorded multimedia message or MMS message 722 as voice mail 728. To establish a connection between the calling party and the multi-media message storage system 424, a Call Connect message 725*a* is sent from the multi-media message storage system to the local CO 412. The calling party local CO 412 sends the Call Connect message 725 to the calling party endpoint 590*a*. Now the call is established between the calling party and the multi-media message storage system 424. The calling party may record a voice message or hang up knowing that the called party will receive the RTM with multimedia components or RTM MMS message.

In an alternative embodiment, the multi-media message storage system 424 may allow the calling party to delete the recorded RTM with multimedia components or MMS message and just record another voicemail message. If the called party has a telephone answering machine depending on the sophistication of the telephone answering machine, it may not record the RTM with multimedia components or the MMS message but allow the calling party to record a voicemail message.

Of course if the called party uses a follow-me service, the called party local CO 412 will transfer the call and RTM with multimedia components or RTM MMS message to the administered follow-me numbers. If the call is diverted to a mobile telephone and the called party uses a SMS or MMS enabled mobile service, the RTM with MMS or SMS components may be stored in the mobile telephone message service center (not shown). Similarly, an RTM with multimedia components may be converted by the RMS agent server in the mobile message service center to a MMS message and stored in the mobile telephone message service center (not shown).

Finally, nothing limits the RMS enabled network to a PSTN 30 network. The RMS enabled network may include Internet 60, a mobile switch center (not shown) or a combination including an enterprise network, such as shown in FIG. 1C.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternative, interchangeable and/or equivalent structures, functions, ranges or steps to those claimed, whether or not such alternative, interchangeable and/or equivalent structures, functions, ranges or steps are disclosed herein, and without intending to publicly dedicate any patentable subject matter.

What is claimed is:

1. A communication method between communication devices, comprising:
   receiving, at a called communication device and as part of a call set-up message, at least one of a text, a picture, a video, and a holographic user message from a first user of a calling communication device, the message being associated with a pending call from the first user to a second user of the called communication device; and
   before the call is answered by the second user, the called communication device extracting the at least one of a text, a picture, a video, and a holographic user message from the call set-up message and displaying said at least one of a text, a picture, a video, and a holographic user message for the second user.

2. The method of claim 1, wherein the called communication device displays the user message instead of playing a ring tone and wherein the user message causes the calling and called communication device to open a bearer channel therebetween, whereby the first user can speak live messages to the second user before the call is answered.

3. The method of claim 1, wherein, when the second user answers the call, one or more call connect messages are exchanged between the calling and called communication devices and wherein the user message comprises a media stream received by the calling communication device in real-time.

4. The method of claim 1, wherein, when the called communication device is busy, the user message is attached to a call-waiting signal, thereby causing the user message to be displayed to the second user instead of a standard call-waiting signal.

5. The method of claim 1, wherein the user message is displayed to the second party instead of a standard call-waiting signal.

6. The method of claim 1, wherein a second voiced user message, different from the user message included in the call set-up message, is forwarded to the called communication device after a call set-up message is received by the called communication device from the calling communication device and played to the second user before the call is answered by the second user.

7. The method of claim 1, wherein the user message is a voice message and wherein, when the second user does not answer the pending call, the voice message is received by a multi-media message storage system associated with the second party.

8. The method of claim 1, wherein the user message further includes a voice message and wherein, when the called communication device is busy, the voice message is sent attached to a call-waiting signal.

9. The method of claim 8, wherein the voice message is played instead of a call-waiting signal.

10. The method of claim 1, further comprising:
    playing an introductory ring tone associated with the first party before displaying the message, the introductory ring tone message indicating that the second party has received or will receive a voice message from the first party, wherein the introductory ring tone is played before the user message is displayed.

11. The method of claim 1, wherein the user message is a text message and further comprising:
    converting the text message to speech before the audibly playing step.

12. The method of claim 1, wherein the user message is sent by the calling communication device and received by the called communication device in-band.

13. The method of claim 1, further comprising:
    sending a ringing signal to the calling communication device in response to the receipt of the user message.

14. The method of claim 1, wherein the playing displaying step is repeated until the call is answered by the second user and wherein the user message comprises a holographic image.

15. A computer readable medium having stored thereon processor executable instructions to perform the steps of claim 1.

16. A communication method between communication devices, comprising:
    providing a calling communication device associated with a first party; and
    sending a call set-up message from the calling communication device to a called communication device associated with a second party, wherein the call set-up message comprises a recorded voice message from the first party to the second party and an alerting message to open a bearer channel from the calling communication device to the called communication device, the bearer channel being configured to receive a live voice message from the first party to the second party, whereby at least one of the recorded and live voice messages is played by the called communication device before a bi-directional communication path is established between the first and second parties.

17. The method of claim 16, further comprising:
providing the first party with at least one of the following options: sending a voice message with a call set-up message and sending a setup message for a live one-way communication from the first party to the second party.

18. The method of claim 16, wherein the recorded voice message is played by the called communication device to the second party, wherein a second voice message to the second party is received by the calling communication device from the first party, the recorded and second voice messages being different, and wherein the second voice message is played by the called communication device to the second party before the bidirectional communication path is established.

19. The method of claim 17, wherein the bearer channel for a live one-way communication is opened, before establishment of the bidirectional communication path between the first and second parties, between the calling and called communication devices and wherein the live voice message is transmitted over the bearer channel to the called communication device.

20. The method of claim 16, wherein the call set-up message comprises the recorded voice message from the first party to the second party and wherein the recorded voice message is received from the first party immediately before the call set-up message is sent to the called communication device.

21. The method of claim 16, wherein the call set-up message comprises the alerting message and wherein the live voice message is sent to the called communication device after the called communication device receives the call set-up message.

22. The method of claim 16, further comprising:
playing, by the called communication device, of a plurality of differing voice messages from the first party to the second party before a bi-directional communication path is established between the first and second parties.

23. The method of claim 22, wherein the called communication device plays the at least one of a recorded and live voice message instead of playing a ring tone.

24. The method of claim 22, wherein the at least one of a recorded and live voice message is the recorded voice message and wherein, when the called communication device is busy, the recorded voice message is attached to a call-waiting signal, thereby causing the recorded voice message to be played to the second party instead of a standard call-waiting signal.

25. The method of claim 22, wherein the at least one of a recorded and live voice message is forwarded to the called communication device after a call set-up message is received by the called communication device from the calling communication device.

26. The method of claim 22, wherein, when the second user does not answer the pending call, the at least one of a recorded and live voice message is received by a voice mail system associated with the second party.

27. The method of claim 22, wherein, when the called communication device is busy, the at least one of a recorded and live voice message is sent attached to a call-waiting signal.

28. The method of claim 22, wherein the at least one of a recorded and live voice message is played instead of a call-waiting signal.

29. The method of claim 22, further comprising:
playing a special introductory ring tone associated with the at least one of a recorded and live voice message before playing the at least one of a recorded and live voice message, the introductory ring tone message indicating that the second party has received or will receive the at least one of a recorded and live voice message from the first party, wherein the introductory ring tone is played before the at least one of a recorded and live voice message is played.

30. The method of claim 22, further comprising:
sending a ringing signal to the calling communication device in response to the receipt of the at least one of a recorded and live voice message.

31. The method of claim 22, wherein the audibly playing step is repeated until the call is answered by the second party.

32. A computer readable medium having stored thereon processor executable instructions to perform the steps of claim 16.

33. A communication device, comprising:
memory; and
a Ring Message Service (RMS) agent operable to receive, as part of a call set-up message, at least one of a text, picture, video, and holographic user message from a first user of a calling communication device, the message being associated with a pending call from the first user to a second user associated with a called communication device containing the RMS agent; and, before the call is answered by the second user, to extract the at least one of a text, a picture, a video, and a holographic user message from the call set-up message and display said at least one of a text, a picture, a video, and a holographic user message for the second user.

34. The device of claim 33, wherein the called communication device displays the user message instead of playing a ring tone and wherein the user message causes the calling and called communication device to open a bearer channel therebetween, whereby the first user can speak live messages to the second user before the call is answered.

35. The device of claim 33, wherein, when the called communication device is busy, the user message is attached to a call-waiting signal, thereby causing the user message to be displayed to the second user instead of a standard call-waiting signal.

36. The device of claim 33, wherein the user message is displayed to the second party instead of a standard call-waiting signal.

37. The device of claim 33, wherein the message is forwarded to the called communication device after a call set-up message is received by the called communication device from the calling communication device and wherein the user message comprises a media stream received by the calling communication device in real-time.

38. The device of claim 33, wherein the RMS agent is operable to play a special introductory ring tone associated with the first party before displaying the message, the introductory ring tone message indicating that the second party has received or will receive a voice message from the first party, wherein the introductory ring tone is played before the user message is displayed.

39. The device of claim 33, wherein the user message is sent by the calling communication device and received by the called communication device in-band.

40. The device of claim 33, wherein the RMS agent is operable to send a ringing signal to the calling communication device in response to the receipt of the user message.

41. The device of claim 33, wherein the RMS agent is operable to repeatedly display the user message until the call is answered by the second user.

42. A communication device, comprising:

memory; and a Ring Message Service (RMS) agent operable (a) to receive, from a first user associated with a calling communication device containing the RMS agent, at least one of a recorded and live voice message from the first party to a second party, the at least one of a recorded and live voice message being associated with a pending call from the first user to the second user associated with a called communication device and (b) send a call set-up message from the calling communication device to the called communication device, wherein the call set-up message comprises both (i) the at least one of a recorded and live voice message from the first party to the second party and (ii) an alerting message to open a bearer channel from the calling communication device to the called communication device, the bearer channel being configured to receive a voice message from the first party to the second party, whereby the at least one of a recorded and live voice message is played by the called communication device before a bi-directional communication path is established between the first and second parties.

43. The device of claim 42, wherein the RMS agent is operable to provide the first party with at least one of the following options: sending a voice message with a call set-up message and sending an alerting message for a live one-way communication from the first party to the second party.

44. The device of claim 42, wherein the at least one of a recorded and live voice message is played by the called communication device to the second party, wherein a second voice message to the second party is received by the calling communication device from the first party, the at least one of a recorded and live voice message and second voice message being different, and wherein the second voice message is played by the called communication device to the second party before the bidirectional communication path is established.

45. The device of claim 42, wherein the bearer channel for a live one-way communication is opened, before establishment of the bidirectional communication path between the first and second parties, between the calling and called communication devices wherein the at least one of a recorded and live voice message is a live voice message, and wherein the live voice message is transmitted over the bearer channel to the called communication device.

46. The device of claim 42, wherein the call set-up message comprises the voice message from the first party to the second party and wherein the voice message is received from the first party immediately before the call set-up message is sent to the called communication device.

47. The device of claim 42, wherein the call set-up message comprises the alerting message and wherein the voice message is sent to the called communication device after the called communication device receives the call set-up message.

48. The device of claim 42, wherein the called communication device plays the voice message instead of playing a ring tone.

49. The device of claim 42, wherein the voice message is forwarded to the called communication device after a call set-up message is received by the called communication device from the calling communication device.

50. The device of claim 42, further comprising the operation:

playing a special introductory ring tone associated with the voice message before playing the voice message, the introductory ring tone message indicating that the second party has received or will receive a voice message from the first party, wherein the introductory ring tone is played before the voice message is played.

51. The device of claim 42, wherein the RMS agent is operable to receive a ringing signal in response to the receipt of the voice message by the called communication device.

52. The method of claim 22, wherein, when the called communication device is busy, the voice message is attached to a call-waiting signal, thereby causing the voice message to be played to the second party instead of a standard call-waiting signal.

53. The method of claim 1, wherein the user message is appended to the call set-up message.

* * * * *

UNITED STATES PATENT AND TRADEMARK OFFICE
CERTIFICATE OF CORRECTION

| | | |
|---|---|---|
| PATENT NO. | : 8,644,886 B1 | Page 1 of 1 |
| APPLICATION NO. | : 10/801960 | |
| DATED | : February 4, 2014 | |
| INVENTOR(S) | : Timothy C. Delaney et al. | |

It is certified that error appears in the above-identified patent and that said Letters Patent is hereby corrected as shown below:

In the Claims:

At Column 18, line 44, please delete the word "playing" therein.

Signed and Sealed this
Seventeenth Day of June, 2014

Michelle K. Lee
*Deputy Director of the United States Patent and Trademark Office*